(12) United States Patent
Prénat

(10) Patent No.: US 6,939,436 B2
(45) Date of Patent: Sep. 6, 2005

(54) MACHINE OF JOINING OF SHEETS OF PLASTICS MATERIALS OF BIG DIMENSIONS

(76) Inventor: Louis Prénat, 2, rue Clotilde Bizolon, 69002 Lyons (FR)

( * ) Notice: Subject to any disclaimer, the term of this patent is extended or adjusted under 35 U.S.C. 154(b) by 184 days.

(21) Appl. No.: 10/256,298

(22) Filed: Sep. 27, 2002

(65) Prior Publication Data

US 2003/0127194 A1 Jul. 10, 2003

(30) Foreign Application Priority Data

Sep. 27, 2001 (FR) .......................................... 01 12597

(51) Int. Cl.$^7$ .............................................. B32B 31/20
(52) U.S. Cl. ................................ 156/380.4; 156/380.6; 156/502; 156/583.7; 156/368
(58) Field of Search ........................... 156/274.4, 274.6, 156/285, 309.6, 368, 379.8, 380.2, 380.3, 380.4, 380.6, 583.1, 502, 304.1, 304.6, 583.7; 269/21; 219/243, 522

(56) References Cited

U.S. PATENT DOCUMENTS 2,675,838 A * 4/1954 Hickok et al. ............ 156/380.3
4,036,676 A * 7/1977 Pennington ............... 156/274.4
5,913,991 A * 6/1999 Kubota et al. ................ 156/64
6,019,153 A * 2/2000 Knokey ....................... 156/502
6,866,732 B2 * 3/2005 Hubbard et al. .............. 156/71

* cited by examiner

Primary Examiner—John T. Haran
(74) Attorney, Agent, or Firm—The Weintraub Group

(57) ABSTRACT

A machine for joining opposite respective edges of respective pairs of large sheets (2) of plastic comprises a frame (1), a rectangular table (10) having a horizontal surface for supporting the sheets in position for joinder, the table provided with an elongated linear slot (18) extending centrally of and between opposite ends of the table and disposed between first and second rows (150, 150') of spaced apart air suction holes (15, 15') that open on the table for pulling the sheets against the table, a fixed electrode (11) disposed in the slot (18), a mobile electrode (14) mounted for vertical up and down movement on top of the fixed electrode, push buttons (19, 19') for activating suction of air through the holes, and control means in the form of a robot to control different operations. The horizontal platform (10) is moveable horizontally relative to the frame (1), in longitudinal direction given by the slot (18) and respective edges of the sheets are overlapped and disposed between the fixed and movable electrodes (11, 14) in a manner to permit the substantially simultaneous shifting of said platform (10) and activation by the electrodes by the robot whereby to join the edges of sheets (2) on top of the platform (10).

10 Claims, 3 Drawing Sheets

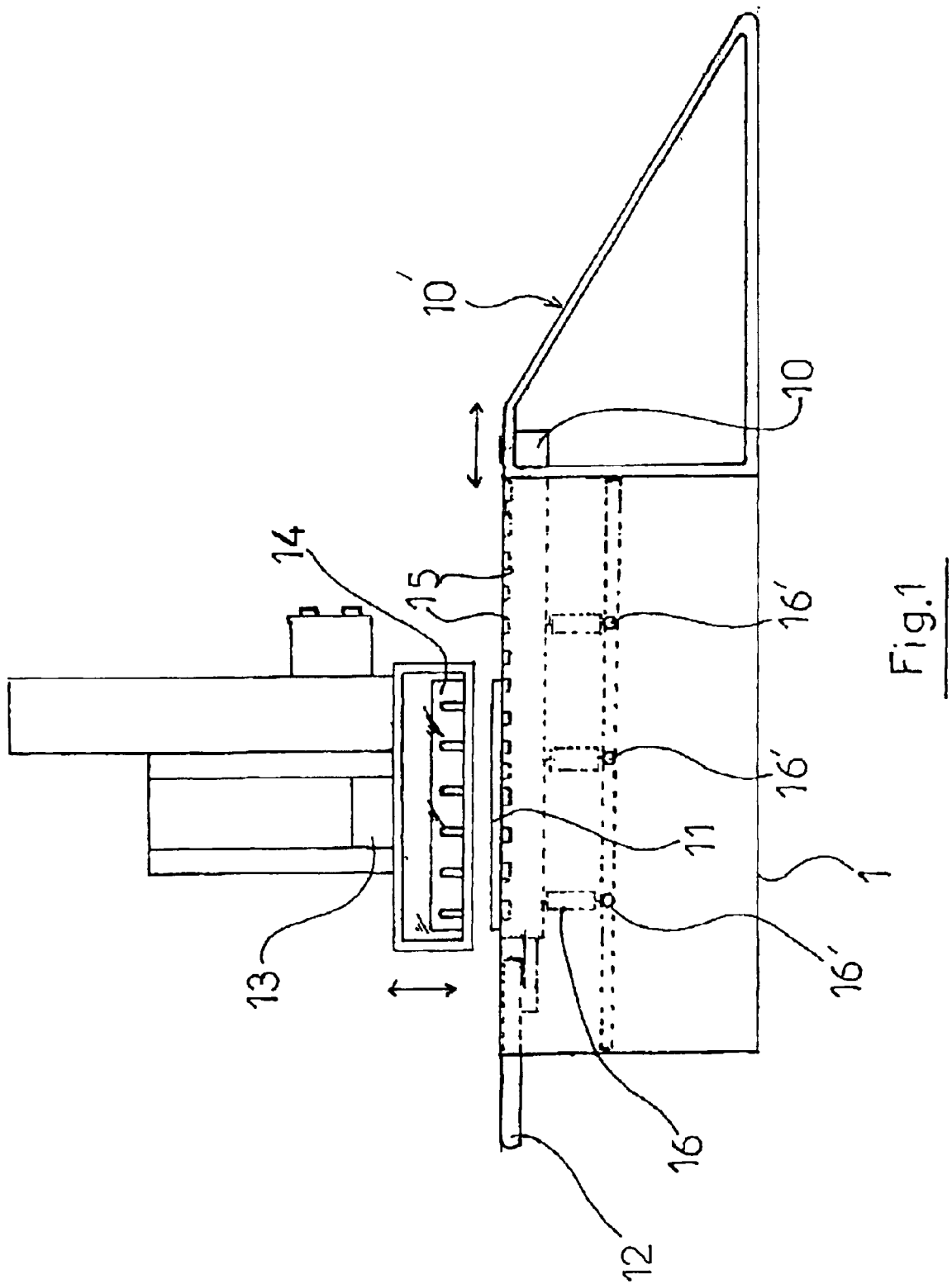

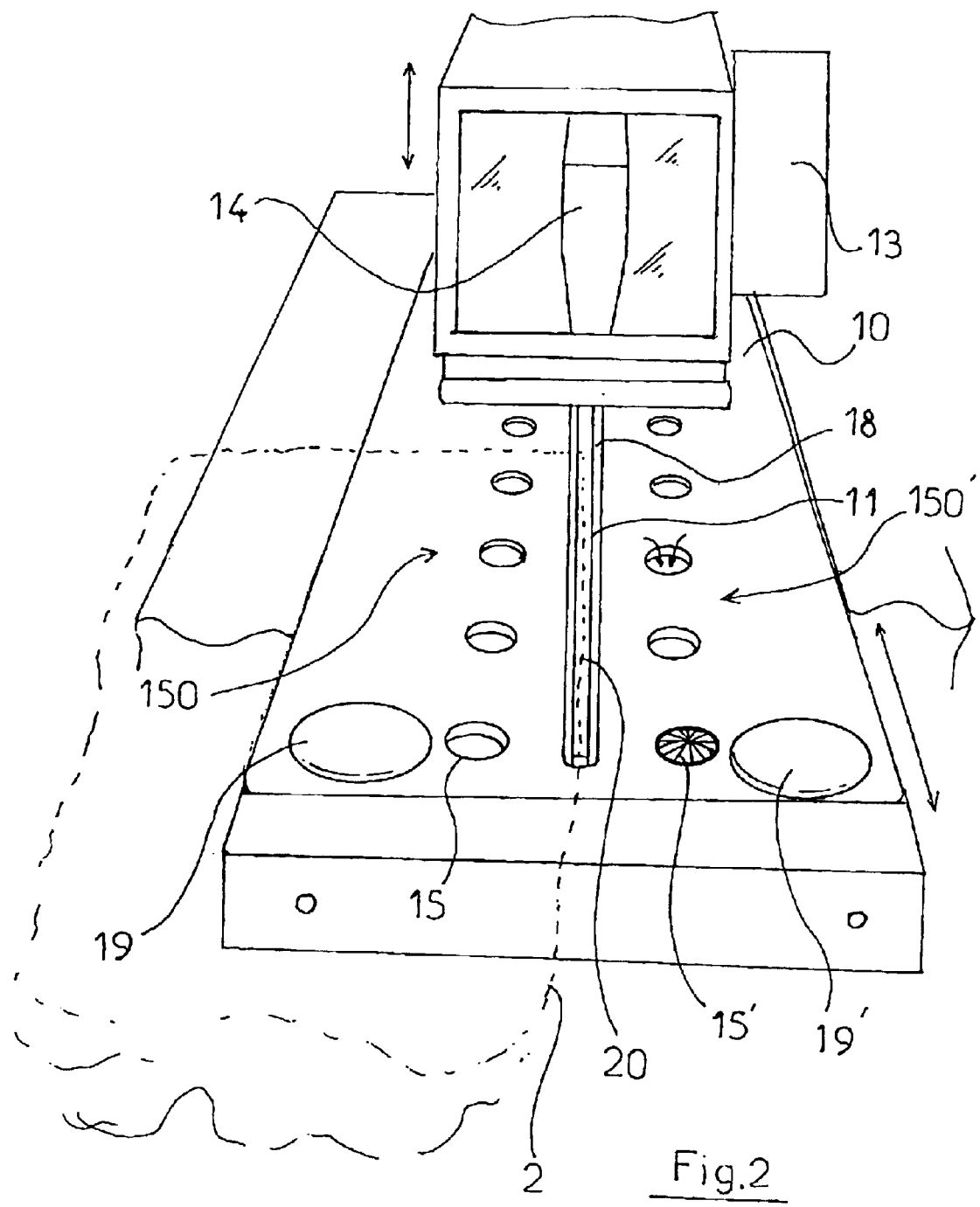

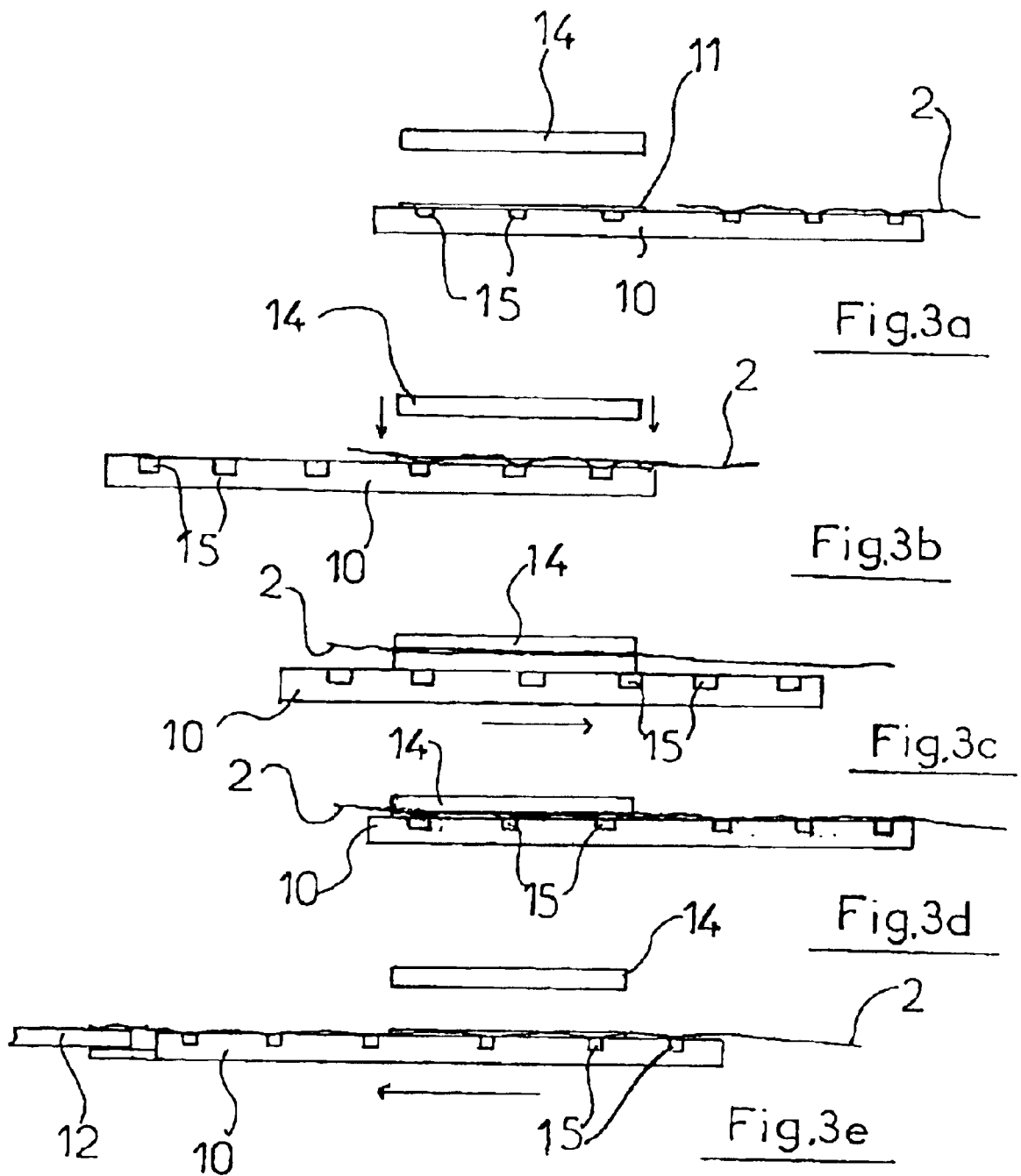

MACHINE OF JOINING OF SHEETS OF PLASTICS MATERIALS OF BIG DIMENSIONS

CROSS-REFERENCE TO RELATED APPLICATIONS

This Application claims priority to French Patent Application No. 01/12597 which was filed on Sep. 27, 2001, the disclosure of which is hereby specifically incorporated herein by reference.

STATEMENT REGARDING FEDERALLY SPONSORED RESEARCH OR DEVELOPMENT

None.

INCORPORATION BY REFERENCE OF MATERIAL SUBMITTED ON A COMPACT DISC

None.

BACKGROUND OF THE INVENTION

1. Field of the Invention

The present invention is directed to an assembly machine for joining the edges of a pair of sheets of plastic material of large dimension.

2. Description of Related Art

The assembly, edge to edge, of two sheets of plastic material of large dimension is realized by two operators placed at the entrance and exit of an assembly machine consisting of a horizontal platform containing a fixed electrode on top of which the first operator places the two edges of the two sheets to be assembled after which, and after having verified that the two edges are placed correctly on the fixed electrode, the operator orders the descent of a mobile electrode in vertical movement on top of the aforementioned edges for the purpose of creating their contact and joining one to the other. After the joinder operation is complete the second operator on the one hand pulls the two sheets away in a manner which permits the first operator to place a new section of edges to be joined, and on the other hand positions material in the center of the fixed electrode to assist the first operator in placing the two edges one on top of the other on the fixed electrode.

However, the use of these machines carries with it a higher assembly cost as a result of the presence of the two operators. On the other hand, the handling operations of the sheets are burdensome to the operator at the exit of the machine who has to pull with force the two sheets of large dimension on each of the assembled edges to remove them from the joinder position. Furthermore, it sometimes happens that the operator, who maintains the two edges on the fixed electrode during their merger, positions by mistake his fingers between the two electrodes, which fingers then are squeezed between the latter.

BRIEF SUMMARY OF THE INVENTION

The object of the present invention is to remedy those inconveniences by providing an assembly machine for joining the edges of respective pairs of sheets of plastic material of large dimension at an operating cost less than the current machines and offering better safety conditions The assembly machine according to the present invention comprises a joinder unit formed of a horizontal platform having a narrow groove or opening that extends lengthwise along and between the opposite ends of the platform and relative to a fixed electrode and a mobile electrode descending vertically on top of the fixed electrode. The horizontal platform is movable in the horizontal direction, in the longitudinal direction, given by the fixed electrode, the length of which electrode is lower to that of the opening, such as to permit the changing of positions of said platform, which has means of supporting a set of sheets on the platform in assembly position and on which said machine has means of control to support the sheets on the platform and a control mechanism for the different operations.

The means which permit to support the sheets on the platform could be described by way of large suction holes placed on the upper surface of said platform permitting the creation of depression zones which have as effect to hold the pieces of sheets to be assembled against the upper surface of the platform. The suction holes preferably are positioned in two ranges of holes spread along each side of the longitudinal center of the platform passing by the fixed electrode, each range of holes permitting the connection of a sheet with the platform.

In a preferred operating mode, the platform shall consist at least of a push button integrated in the upper side of the platform for the operation of the suction holes. The platform shall preferably consist of two push buttons able to control each range of suction holes. The two push buttons controlling the suction holes could equally be used for the control of the shifting of the platform, particularly in the starting phase of the joinder process, after having positioned the first set of sheets to be assembled on the platform. The pilot shall not order the shifting of the platform until after the operator has validated the positioning of the sheets to be assembled on the platform.

Likewise, the machine according to the proposed invention carries the advantage over the current machines to operate with a single operator placed at the entrance of the machine.

The advantages and characteristics of the proposed invention become most clear as a result of the following description and which corresponds to the attached design, which represents one operating mode but is not necessarily limited thereto.

BRIEF DESCRIPTION OF THE SEVERAL VIEWS OF THE DRAWINGS

FIG. 1 represents a schematic profile of the machine according to the present invention.

FIG. 2 represents a partial view from the perspective of the person in front of the machine according to the present invention.

FIGS. 3a, 3b, 3c, 3d, and 3e represent a schematic layout of the different stages of the functioning of the machine according to the present invention.

DETAILED DESCRIPTION OF THE INVENTION

With reference to FIG. 1, one can see that an assembly machine according to the proposed invention comprises a framework or frame (1) supporting a horizontal table (10) of rectangular dimension for the positioning of a pair of sheets (2) to be assembled, which frame (1) stretches in front of two ramps (10') between which moves an operator not depicted, and a mobile cart (13) in vertical movement on top of the table (10) and carrying a horizontal electrode (14).

The assembly machine is controlled and its functioning controlled by the operator and by a robot.

The table (10) is traversed in the length by a fixed electrode (11) affixed to the frame or framework (1) permitting the joinder of the sheets to be joined with the mobile electrode (14) and is movable in the direction of its longitudinal center parallel to the fixed electrode (11). The table (10) consists of suction holes (15) creating the depression zones permitting the support of the sheets in position on table (10).

One can equally see that the table (10) is mobile in vertical movement due to jacks (16), each mounted on a rolling device or bearing (16') and guided in movement by a guiding or guide rail (17) permitting the table (10) to roll in or slide relative to the frame or framework (1).

The two ramps (10') permit the operator to prepare the sheets to be assembled before their positioning on the table (10) and prevent the sheets to come in contact with the corners of the table (10) and therefore to be torn.

A little shelf (12) situated at the backside of the frame (1), at the exit of the machine, is affixed to the table (10) and rendered mobile in parallel with the latter. Its purpose is to facilitate the removal of the assembled sheets by supporting them and pulling them. The shelf (12) likewise permits the joined sheets to drop at a remote point at the back of the table (10), and prevent the jamming and folding of the sheets which would result without the presence of the lower shelf and which could have as consequence the coming apart of the sheets at the front of the machine. The little shelf (12) has thus as purpose to accompany the removal of the joint sheets while supporting them flat on the table (10) in order to avoid that they lift themselves and that the air passes under the sheets causing them to come lose from the table (10).

If one were to refer to FIG. 1, one can see that rolling table (10) comprises a narrow opening (18) placed centrally, extends in the longitudinal direction, and is run through by the fixed electrode (11) at an inferior length than that of the narrow opening (18) in a manner which permits the shifting of the table (10).

In order to protect the operator, as shown in FIGS. 1 and 2 and as identified on FIG. 3a, the mobile electrode (14) is isolated by a cage (14') with an opening on its bottom.

One can equally see on FIG. 1 that table (10) comprises two rows or lines (150, 150') of spaced apart suction holes (15) situated on each side of the narrow opening (18) and controlled in the suction function by means of two push buttons (19, 19') able to equally control the shifting of the rolling table (10). If one were to refer to FIGS. 3a–3e one can see that the functioning of the machine is as follows:

The operator places one sheet (2) of large dimension on the table (10) (See FIG. 3e), such as to position the edge (20) of the sheet (2) to be assembled with the edge of a second sheet, not shown, on top of the narrow opening (18) of table (10) after which the operator orders the functioning of the suction holes (15) over the corresponding row or line (150) by pushing on the push button (19) situated near the first row of suction holes (15) which has as result the affixing of sheet (2) on the table (10). The second sheet is then positioned in the same manner by overlaying the second sheet edge with the edge of the first sheet, after which the operator orders the control of the second row (150') of suction holes (15) to support the second sheet in position on the table (10).

The operator then commands the shifting of the table (10) (FIG. 3b) such as to present the two edges to be assembled on top of the fixed electrode (11) to be in joinder position.

Then the robot which controls the machine, after having detected the joinder position of the two sheets, orders the descent of the mobile electrode (14) on top of the two edges of the two sheets (FIG. 3c) and puts the joinder operation into motion. During the joinder operation the robot commands the end of operation of the suction holes (15), then commands the descent of the table (10) by means of jacks (16) in a manner of letting it roll towards the front of the machine while limiting the rubbing with the two sheets. During the rolling towards the front of the machine, the back part of the table (10) then comes under the edges in the course of joinder and the front of the table (10) comes towards the operator level who can then during the joinder operation position a new section of edges to be assembled. (FIG. 3d)

To remove the section of joint edges, the robot orders the shifting of the table (10) towards the rear of the machine only when the operator has validated the operation of positioning a new section of edges to be joined on the table (10) and after having commanded the repositioning of the table (10) to the initial position.

Once the merging operation is terminated, the robot orders the shifting of the table (10) towards the rear (FIG. 3e) to remove the joint parts of the sets of two joined sheets (2) of large dimension.

Contrary to current procedures where the positioning operation and joinder operation are in sequence, with the assembly machine according to the proposed invention they are made in overlapping time, that is that the positioning of the sheets s accomplished by the machine in the proposed invention during the joinder operation, with a single person.

What is claimed is:

1. An assembly machine for joining the respective edges of a pair of sheets (2) of plastic material of large dimension to one another, comprising a horizontal platform (10), said platform having an upper surface provided with an elongated longitudinal groove (18) extending between opposite ends of the surface, a first electrode (11) fixedly positioned relative to said groove and substantially coextensive therewith, a second electrode (14) mounted for vertical movement on top of the first electrode, the horizontal platform (10) being movable horizontally and in the longitudinal direction defined by the direction of the first electrode (11), means (15, 15') for retaining a set of sheets (2) against the upper surface of the platform (10) and the respective edges of the sheets in assembly position, the means including an array of suction holes and a source of pulling a vacuum through the holes, means (19, 19') for actuating the vacuum source to suck air through the suction holes and maintain the sheets on the platform, and a robot which controls different operations.

2. The assembly machine of claim 1, further wherein the suction holes (15) open on the upper surface of said platform (10), create depression zones which hold the sheets to be assembled against the upper surface of the platform.

3. The assembly machine of claim 2, further wherein the suction holes (15, 15') are arranged into two rows (150, 150') of holes extending longitudinally, the rows extending, respectively, in parallel relation to one another and along one and the other side of the electrode (11), each row of holes (15, 15') permitting the affixation of one sheet to the upper surface of the platform (10).

4. The assembly machine of claim 2, further wherein the means for actuating comprises at least one push button (19, 19') integrated in the upper surface of said platform (10) to actuate the vacuum source, wherein to suck air through the suction holes and pull the sheets against the upper surface.

5. The assembly machine of claim 3, further wherein the means for actuating comprises two push buttons (19,19')

each operable independently of the other to actuate the vacuum source corresponding to one and the other respective series (150, 150') of suction holes (15, 15'), wherein to suck air through the suction holes and pull the sheets against the upper surface.

6. The assembly machine of claim 2, further comprising the provision of cross-bars, the cross-bars being positionable relative to the suction holes (15, 15') to avoid the deformation of the sheets at the suction point.

7. The assembly machine of claim 2, further comprising a framework (1), and wherein said platform (10) is supported on the framework for relative horizontal sliding movement thereatop.

8. The assembly machine of claim 2, further comprising means for supporting the platform (10) for horizontal rolling movement, said means for supporting comprising a guide rail (17), guide jacks (16) and roller bearings (16') supported on said guide rail, each of said guide jacks (16) having opposite ends, respectively, connected to the platform (10) and mounted to one said roller bearing (16').

9. The assembly machine of claim 8, further wherein said machine includes an inlet and an outlet, and further comprising a shelf (12) situated at the exit of the machine, said shelf being connected to the platform (10) and rendered moveable in the direction of the platform.

10. The assembly machine of claim 8, further comprising a framework which includes ramps and supports the platform (10), aid ramps being at the front of the machine and at the entrance thereto with the ramps (10) forming a space in between which the operator moves.

* * * * *